United States Patent
Stieff et al.

(10) Patent No.: US 9,616,860 B2
(45) Date of Patent: Apr. 11, 2017

(54) PORTABLE WHEEL ROLLING APPARATUS

(71) Applicant: Hunter Engineering Company, St. Louis, MO (US)

(72) Inventors: Michael T. Stieff, Wentzville, MO (US); Craig A. Carroll, O'Fallon, MO (US)

(73) Assignee: Hunter Engineering Company, St. Louis, MO (US)

( * ) Notice: Subject to any disclaimer, the term of this patent is extended or adjusted under 35 U.S.C. 154(b) by 32 days.

(21) Appl. No.: 14/203,892

(22) Filed: Mar. 11, 2014

(65) Prior Publication Data

US 2014/0262565 A1   Sep. 18, 2014

Related U.S. Application Data

(60) Provisional application No. 61/777,889, filed on Mar. 12, 2013.

(51) Int. Cl.
| | |
|---|---|
| *B60S 13/00* | (2006.01) |
| *B60L 11/18* | (2006.01) |
| *B66F 7/24* | (2006.01) |
| *B62B 5/00* | (2006.01) |

(52) U.S. Cl.
CPC ............. *B60S 13/00* (2013.01); *B60L 11/18* (2013.01); *B62B 5/003* (2013.01); *B62B 5/0026* (2013.01); *B66F 7/246* (2013.01); *B62B 5/005* (2013.01); *B62B 5/0033* (2013.01); *B62B 5/0043* (2013.01); *B62B 5/0089* (2013.01)

(58) Field of Classification Search
CPC ........ B60L 11/18; B60S 13/00; B62B 5/0026; B62B 5/003; B62B 5/0033; B62B 5/0043; B62B 5/005; B62B 5/0089
See application file for complete search history.

(56) References Cited

U.S. PATENT DOCUMENTS

| | | | |
|---|---|---|---|
| 2,432,156 A | 12/1947 | Hill | |
| 2,949,972 A | 8/1960 | Wirkkala | |
| 3,527,090 A * | 9/1970 | Mituo | G01L 5/13 324/162 |
| 3,653,330 A * | 4/1972 | Yard | B61J 3/12 105/26.1 |
| 4,125,029 A * | 11/1978 | Krezak | B60S 13/00 180/342 |
| 4,582,154 A | 4/1986 | Englund | |

(Continued)

*Primary Examiner* — Kevin Hurley
*Assistant Examiner* — Marlon A Arce
(74) *Attorney, Agent, or Firm* — Polster, Lieder, Woodruff & Lucchesi, LC

(57) ABSTRACT

A portable powered roller assembly configured to impart a motive force to a wheeled vehicle or structure consists of a roller mounted in a rolling support structure. The roller is rotationally driven by a battery-powered drive unit coupled through a torque multiplying transmission, and is configured for engagement with the circumferential surface of a vehicle wheel. Rotational movement of the roller in engagement with the circumferential surface of the vehicle wheel draws the powered roller assembly towards, and under, the curved circumferential surface of the vehicle wheel, imparting a force to the vehicle wheel which include both a lifting force perpendicular to the supporting surface on which the powered roller is resting, and a motive force parallel to the surface.

12 Claims, 5 Drawing Sheets

(56) References Cited

U.S. PATENT DOCUMENTS

| | | | | |
|---|---|---|---|---|
| 4,687,070 | A * | 8/1987 | Ricciardi | B60S 13/00 180/14.7 |
| 4,848,142 | A * | 7/1989 | Fujimori | G01M 17/0072 73/116.06 |
| 7,145,298 | B1 | 12/2006 | Garner | |
| 7,168,514 | B2 * | 1/2007 | Newell | B60L 11/18 180/15 |
| 7,506,707 | B2 * | 3/2009 | Trujillo | B60L 11/18 180/19.1 |
| 8,235,152 | B2 * | 8/2012 | Kastan | B60S 13/00 180/19.2 |
| 8,240,197 | B2 * | 8/2012 | Lawrence | G01M 17/0074 73/116.06 |

* cited by examiner

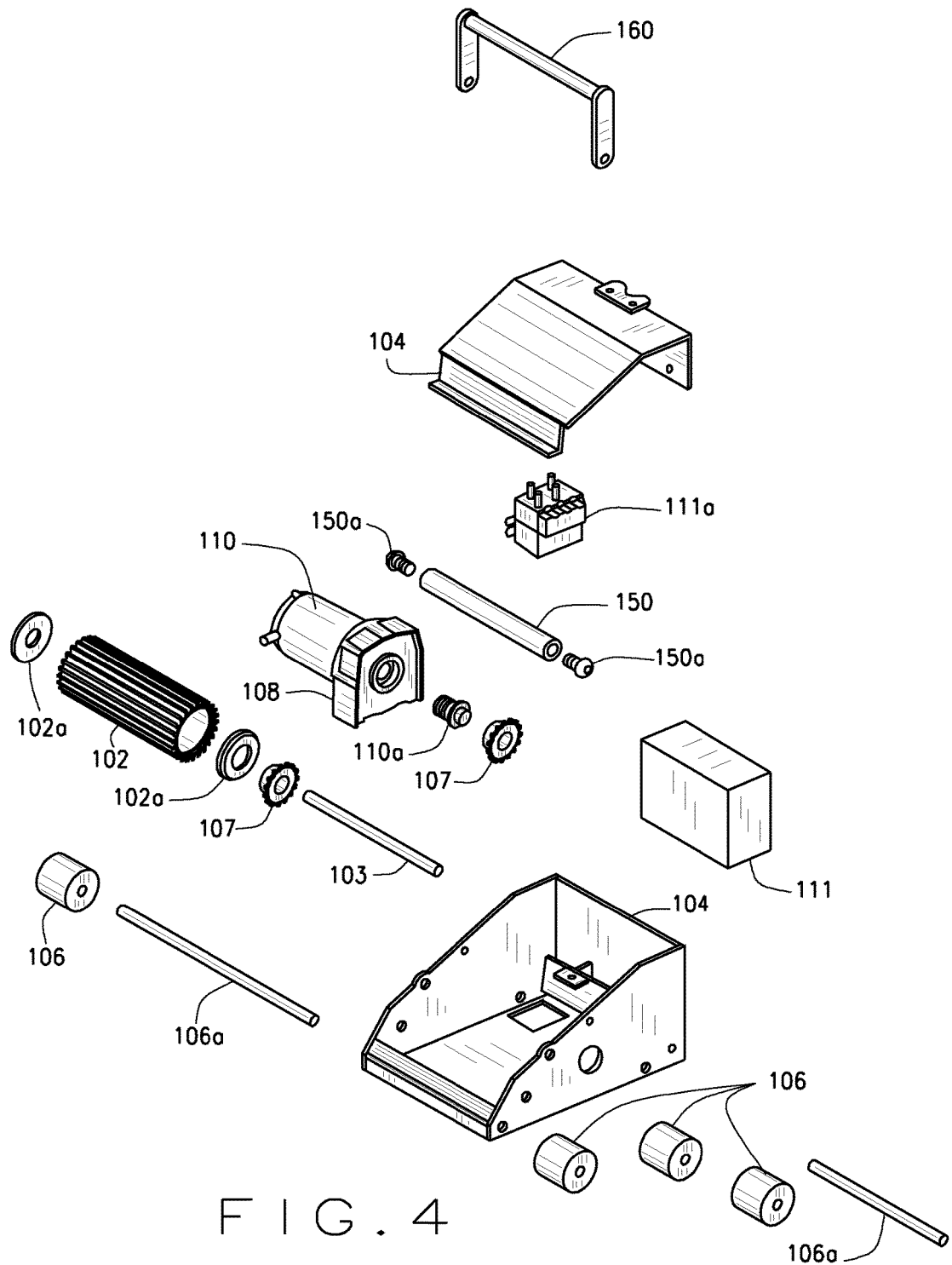
F I G . 4

PORTABLE WHEEL ROLLING APPARATUS

CROSS-REFERENCE TO RELATED APPLICATIONS

The present application is related to, and claims priority from, U.S. Provisional Patent Application Ser. No. 61/777,889 filed on Mar. 12, 2013, and which is herein incorporated by reference.

STATEMENT REGARDING FEDERALLY SPONSORED RESEARCH

Not Applicable.

BACKGROUND OF THE INVENTION

The present invention is related generally to devices for repositioning wheeled vehicles, and in particular, to a powered roller for imparting a controlled slow-speed rolling movement to a vehicle wheel assembly and associated vehicle.

There exist innumerable varieties of wheeled vehicles and structures which are supported on wheels for rolling movement over surfaces. These vehicles and structures may include an onboard power source for providing a motive force in order to move the vehicle or structure across the surface, such as passenger cars, trucks, fork lifts or aircraft. Alternatively, the wheeled vehicles or structures may be unpowered, relying upon the application of an external force for movement, such as trailers, wagons, rolling cranes, etc. Regardless of the specific source of motive power, many of these wheeled vehicles and structures are heavy, and are difficult for an individual operator to move without utilizing either an onboard power source such as an engine, or an external motive source, such as a winch or secondary vehicle in a pushing or pulling arrangement.

There exists the occasional need for an individual operator to reposition or move a heavy wheeled vehicle, structure, or cylindrical roll of material a short distance without the use of an onboard power source or reliance upon a secondary vehicle (i.e., the onboard engine may not be operable, fuel may be expensive, or a secondary vehicle may not be available). For example, within an automotive service environment, there may be the need to roll a heavy vehicle such as a truck or passenger car a short distance while on a vehicle lift or support structure in order to complete a vehicle service procedure. Other situations in which a vehicle or structure may need to be rolled a short distance, may include, but are not limited to, repositioning of a vehicle within a parking structure, removal of a disabled vehicle from traffic lanes of an roadway, or "push back" of an aircraft from an airport terminal. In the material handling industry, large rolls or coils of bulk material, such as metals, cloth, or paper commonly need to be transported from storage locations to feed points associated with material processing machinery.

A variety of portable self-powered vehicle pushing systems are known for enabling an operator to engage a vehicle or roll of material to be moved and impart a motive force there to. These portable self-powered vehicle pushing systems rest on the same surface upon which the vehicle or roll of material is disposed, and are driven by means of one or more driven traction wheels in direct engagement with the supporting surface. Engagement between the portable self-powered vehicle pushing system and the frame or body component of the vehicle to be moved, such as a bumper, allows the motive force exerted by the traction wheels to be transferred to the vehicle, resulting in rolling movement. For systems designed to move rolls of material, a second driven wheel or roller may be provided in the pushing system for engagement with the surface of the material roll. With the second driven wheel or roller driven in a rotationally opposite direction from the driven traction wheels, the motive force exerted by the system is split between the traction wheels and the second driven wheel or roller, both propelling the system forward and imparting a rotational force to the exterior surface of the material roll to be moved.

However, these systems suffer from several potential drawbacks. First, the portable self-powered vehicle pushing systems are relatively light weight compared to the vehicle or roll of material which is being moved. The driven traction wheels may not be able to provide sufficient traction against the supporting surface on which they rest in order to move the vehicle with which the pushing system is engaged. Second, if the vehicle to be pushed is disposed on a vehicle lift structure or supporting runway in an automotive service bay, there may not be any supporting surface present in front of, or behind the vehicle in a location which would be suitable for placement of the pushing system, particularly if the pushing system requires placement against the mid-line of either the front or rear vehicle bumper. Third, if a second driven wheel or roller is employed to engage the surface of the material to be moved, the limited motive force exerted by the pushing system is split between the traction wheels and the second driven wheel or roller, reducing efficiency. Finally, it is entirely possible that there is no portion of the vehicle frame, body, bumper components, or surface which can be engaged by the pushing system, either due to their delicate nature (such as on fragile, antique, or valuable vehicles), or due to their physical configuration (such as on vehicles with large ground clearance).

Accordingly, there is a need for an efficient portable self-powered vehicle pushing system which is light weight, capable of being operated by an individual operator, and which does not rely upon the engagement of one or more powered traction wheels or rollers with an underlying supporting surface to impart a motive force to a wheeled vehicle or cylindrical structure to initiate a controlled slow-speed rolling movement of the wheeled vehicle or structure.

There is a further need for a portable self-powered vehicle pushing system which does not engage the stationary frame or body components of a wheeled vehicle or structure when imparting a motive force to the wheeled vehicle or structure.

BRIEF SUMMARY OF THE INVENTION

Briefly stated, the present disclosure sets forth a portable powered roller assembly configured to impart a motive force to a wheeled vehicle or structure to initiate a controlled slow-speed rolling movement of the wheeled vehicle or structure. The portable powered roller assembly consists of a roller mounted in a rolling support structure. The roller is rotationally driven by a battery-powered drive unit coupled through a torque multiplying transmission, and is configured for driving engagement with the circumferential surface of a vehicle wheel or structure. Rotational movement of the roller in engagement with the circumferential surface of the vehicle wheel or structure draws the powered roller assembly towards, and under, the curved circumferential surface of the vehicle wheel, acting as a wedge to imparting a force to the vehicle wheel or structure which include both a lifting force component perpendicular to the supporting surface on which the powered roller is resting, and a motive force component parallel to the surface.

In an embodiment, the portable powered roller assembly includes operator controls disposed on an elongated handle, enabling an operator to activate or deactivate the battery-powered drive unit from a standing position while the roller is disposed in contact with the vehicle wheel and the supporting surface.

In a further embodiment, the portable powered roller assembly includes a dead-man activation switch, configured to require the operator to direct a pushing force towards the roller in order to activate the battery-powered drive unit to provide the motive force to the roller in driving engagement with the vehicle wheel or structure. Release of the pushing force by the operator deactivates the battery-powered drive unit, providing the operator with an intuitive control structure for imparting motive force to a vehicle wheel or structure.

In a further embodiment, the portable powered roller assembly includes a brake or locking feature which holds the roller in a fixed position, and/or retracts the rolling elements of the rolling support structure from contact with the underlying support surface, enabling the roller assembly to function as a chock or wheel brake to prevent rolling movement of a vehicle wheel in a single direction.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 4 is an exploded view of the primary components of the powered roller assembly of FIG. 1.

Corresponding reference numerals indicate corresponding parts throughout the several figures of the drawings. It is to be understood that the drawings are for illustrating the concepts set forth in the present disclosure and are not to scale.

Figure 1:
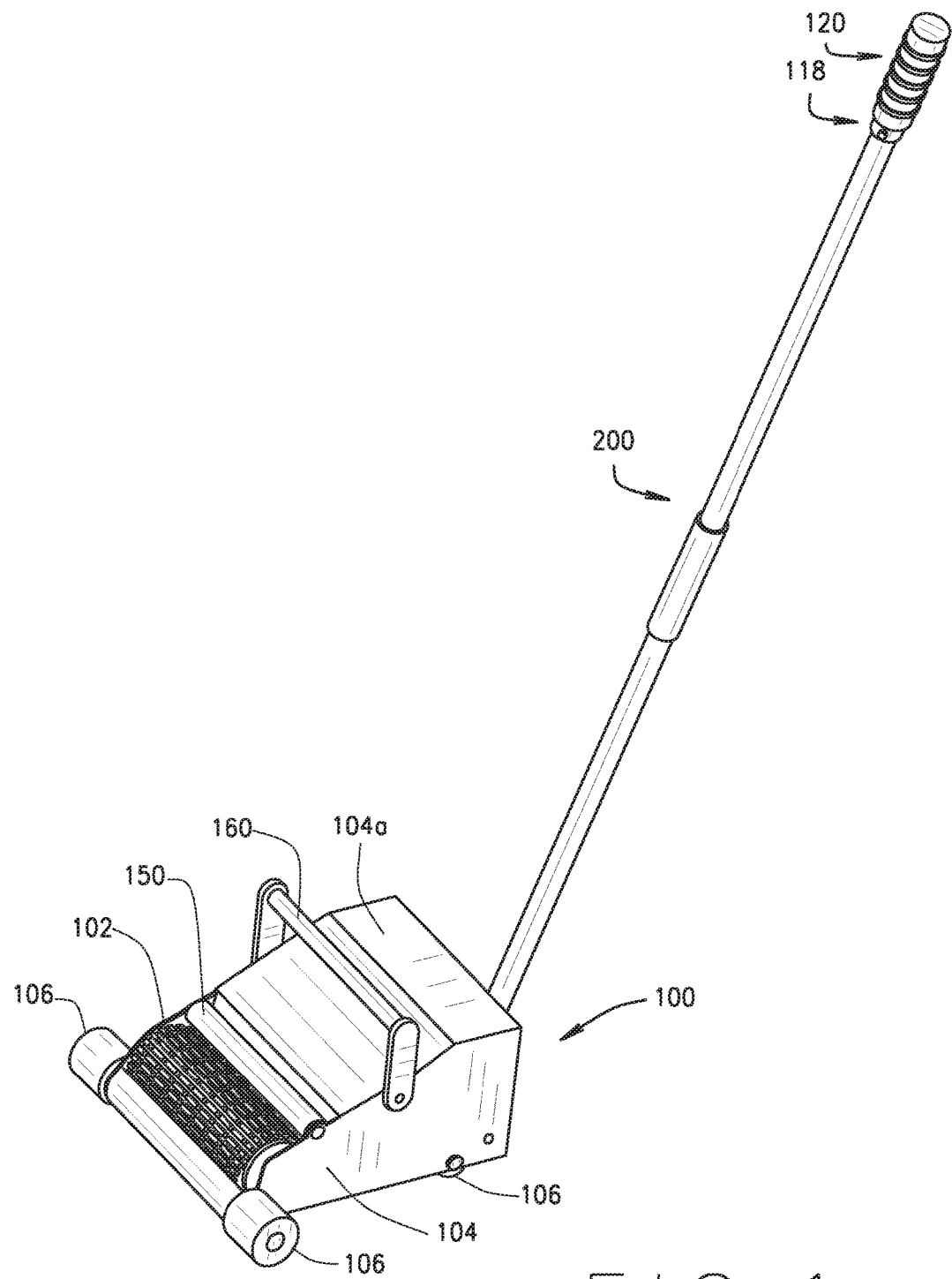
FIG. 1 is a perspective view of a powered roller assembly of the present disclosure with a battery-powered drive unit.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the figures, and to FIG. 1 in particular, a powered roller assembly of the present disclosure is shown generally at 100. The powered roller assembly consists of a primary roller 102, mounted on an axial shaft 103 at opposite axial ends 102a for rotation transversely within a framework 104 above a supporting surface on which the powered roller assembly 100 is disposed. While shown in the figures as generally cylindrical, those of ordinary skill in the art will recognize that the primary roller 102 may have a variety of different configurations without departing from the scope of the disclosure. For example, the primary roller 102 may define a wasp-waisted or hour-glass type configuration to conform to wheel surfaces which are rounded or narrow, it may be solid, or it may consist of a cylindrical outer element supported by axial end pieces on an axial shaft as shown in FIG. 4. The framework 104 is configured for rolling movement across the support surface, for example, by utilizing a set of free-rotating solid rollers 106 on axles 106a disposed below and parallel to the rotational axis of the primary roller 102. Those of ordinary skill in the art will recognize that the set of solid rollers 106 may be replaced by any of a number and variety of un-driven rolling elements in a suitable set, including casters, wheels, compliant rollers, or pneumatic wheels without departing from the scope of the present disclosure. The number of, and selection of, free-rotating or un-driven rolling elements is at least partially determined by the type of surface over which the powered roller assembly 100 is intended to be used. Solid rollers such as shown at 106 are suitable for flat rigid surfaces, such as a vehicle lift rack or finished concrete floor, while individual wheels or compliant rollers would be better suited for uneven surfaces or surfaces having loose debris, such as gravel or sand.

Figure 2:
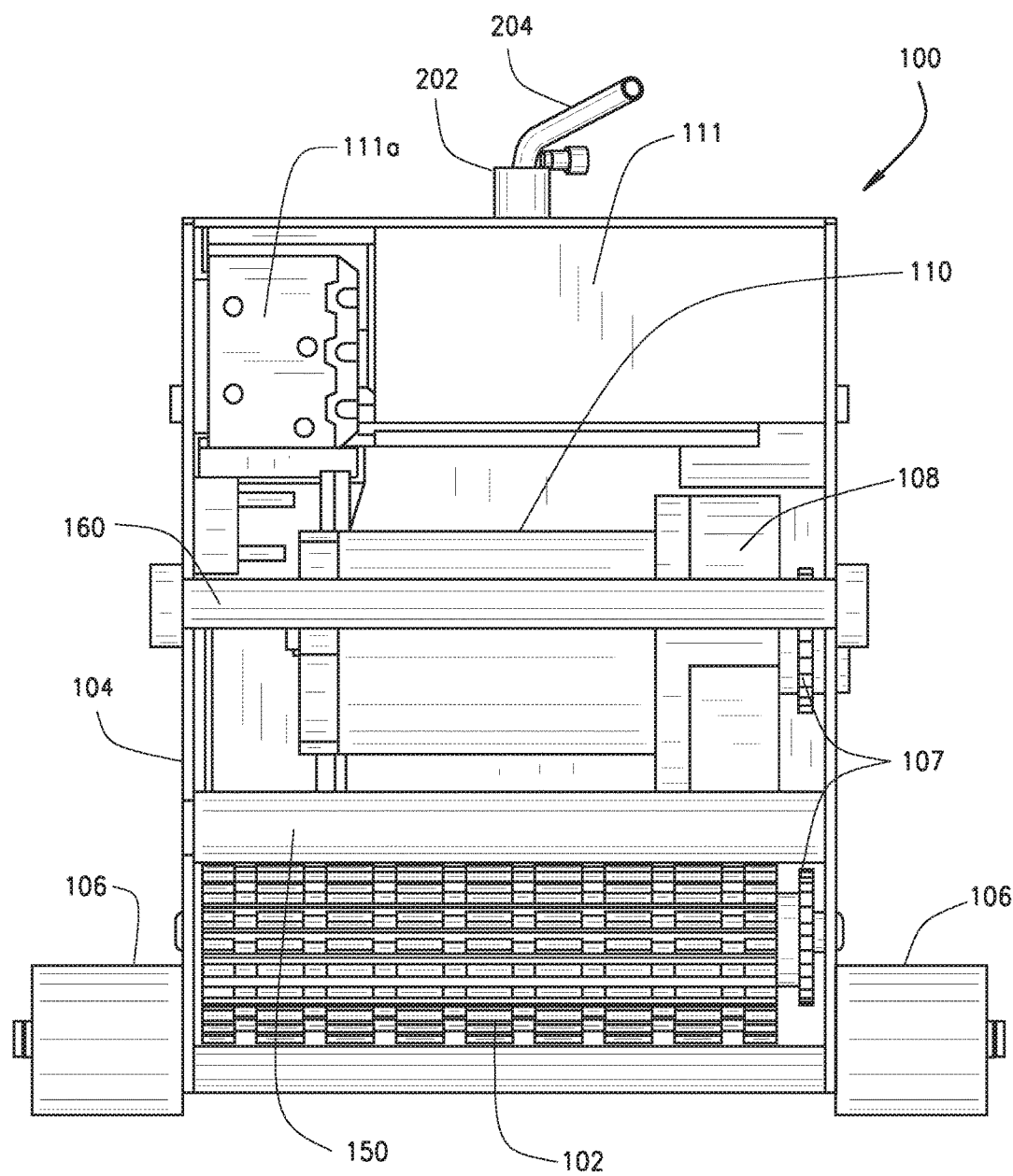
FIG. 2 is a top view of the powered roller assembly of FIG. 1, with the outer cover removed.
Figure 3:
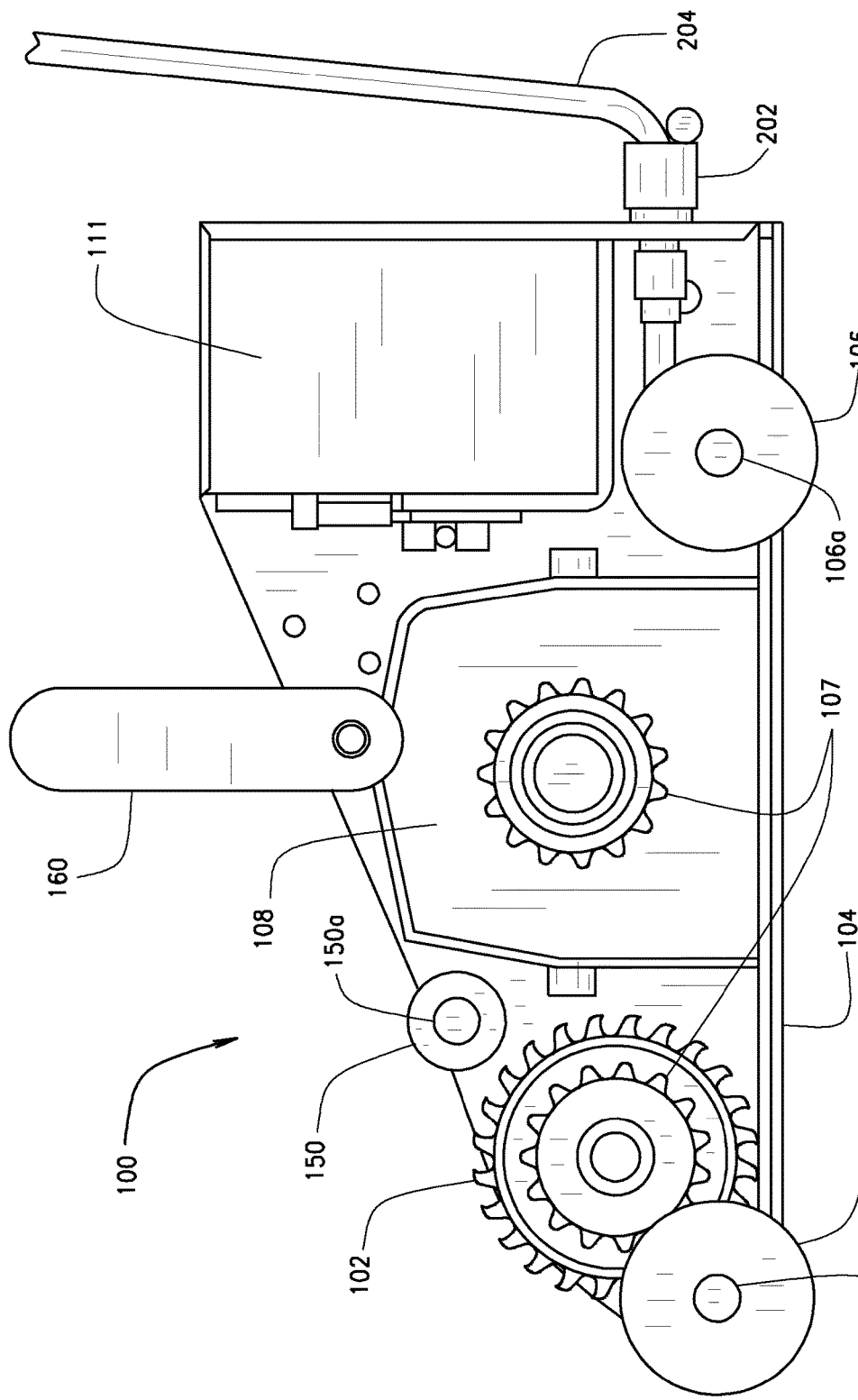
FIG. 3 is a left side view of the powered roller assembly of FIG. 1, with the outer covering and supporting frame removed, illustrating the relationships between the primary roller, supporting rollers, motor, transmission, and battery.

As best seen in FIGS. 2-3, the primary roller 102 is preferably provided with a surface coating or surface texture such as knurls or grooves which is selected to provide increased friction between the primary roller 102 and the outer circumferential surface of a vehicle wheel assembly, tire, or circumferential surface of a structure when the powered roller assembly 100 is in use.

To provide a motive force to a vehicle wheel assembly, tire, or other circumferential during use, the primary roller 102 is coupled via a torque transmitting element 107 such as an axial shaft or drive chain (not shown) to a speed-reducing and torque-multiplying transmission 108. The transmission receives driving power from an output shaft 110a of a power unit 110 disposed within the framework 104, and conveys it to the primary roller 102 via the torque transmitting element 107. Optionally, the power unit 110, if suitably configured, may be coupled directly to the torque transmitting element 107 of the primary roller 102, eliminating the need for a separate transmission system 108. Those of ordinary skill in the art will recognize that a variety of transmission configurations are possible without departing from the scope of the present disclosure, including multi-speed transmissions, locking transmissions, and planetary gear transmissions. The selection of a particular transmission configuration and drive coupling is at least partially dependent upon the intended use for the powered roller assembly 100 (i.e., the size and weight of the vehicles to be moved), and the specifications of the power unit 110 (i.e., rated torque output, rotational speed, etc.).

As shown in FIG. 2, the power unit 110 is preferably powered by a battery 111 through a suitable power relay circuit 111a, both contained within the framework 104, and includes a simple on-off switch 118 for operator control, preferably disposed on the guide arm 200 and coupled to the power relay circuit 111a via suitable cables 204. The switch may be a traditional toggle-type switch, a trigger mechanism, or other suitable mechanism such as a dead-man arrangement which requires continuous operator-applied pressure in the general direction of travel to activate the power unit 110. The power unit 110 may optionally include a speed selection switch 120, or a variable speed control means such as a twist handle, by which an operator can regulate the rotational speed and/or the torque supplied by the power unit 110, directly altering the rotational speed and/or torque applied to the primary roller 102. The specific configuration of the power unit 110 and associated controls may be varied from that shown in FIG. 1, in part based upon ergonomic considerations and in part based on the operating environment in which the powered roller assembly 100 is intended for use. Alternative sources of power may be employed without departing from the scope of the invention, for example, the transmission 108 may be driven by a pneumatic motor or power unit, receiving a supply of pressurized air from an available source associated with a vehicle service bay through associated cabling or hose (not shown).

Figure 5:
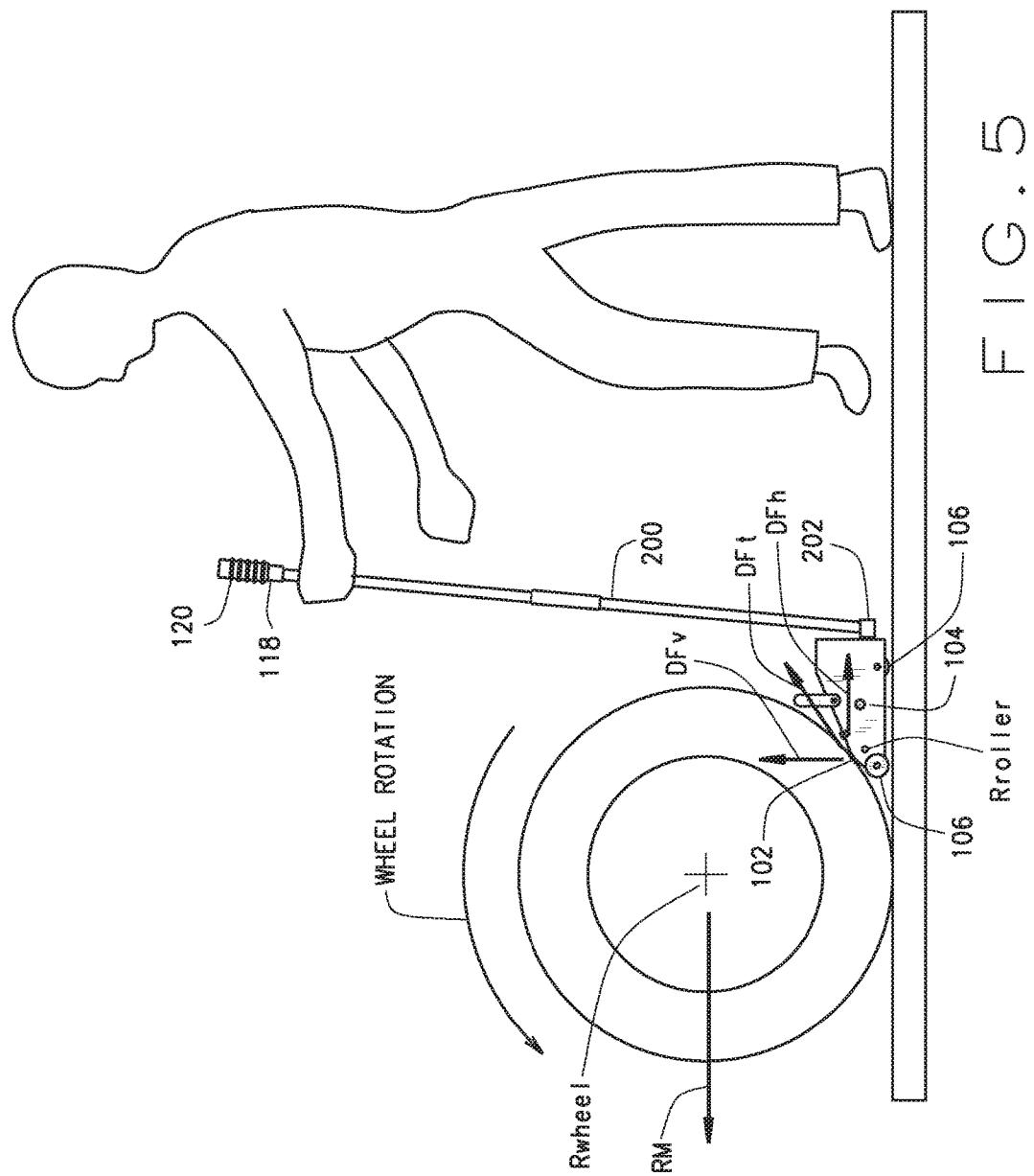
FIG. 5 is a simplified illustration of the powered roller assembly of FIG. 1 positioned for operative engagement with a vehicle wheel.

For example, the power unit 110 is disposed in close proximity to the transmission 108, and is ideally suited for with the powered roller assembly 100 when imparting rolling movement to a vehicle which is disposed on a support structure such as a vehicle lift rack which is elevated relative to the operator. In an alternative embodiment, the power unit 110 and/or the switches 118, 120 may be disposed on an elongated guide arm 200, such as shown in FIG. 1, away from the transmission 108. An elongated guide arm 200 may be configured to enable an operator to position and actuate the powered roller assembly 100 from a standing position, without the need to bend over or reach beneath a vehicle, as seen in FIG. 5. In yet another embodiment, the switches 118, 120 or other suitable controls, may be remotely disposed relative to the power unit 110, such as within a hand-held control unit (now shown), and operatively coupled to the power unit 110 via a connecting cable or wireless communications link, enabling the operator to be safely positioned away from the immediate vicinity of the vehicle during any rolling movement.

Preferably, the framework 104 is provided with a removable cover 104a, which facilitates access to the internal components of the assembly 100, such as the battery 111 for ease of service and replacement. As best seen in FIG. 2, the primary roller 102 outer circumferential surface protrudes from the framework 104 and above the cover 104a by an amount sufficient to enable the surface to engage a vehicle wheel out surface without interference from either the framework 104 or cover 104a. A supporting guide roller 150, best seen in FIGS. 2 and 4 may be positioned in the framework 104 on stub shafts 150a, in proximity to the protruding surface of the primary roller 102 to prevent accidental contact between the vehicle wheel surface and the cover 104. A handle 160 may be provided to facilitate carrying transport of the powered roller assembly 100.

To use the powered roller assembly 100 to impart a motive force to a wheeled vehicle or structure, the assembly 100 is initially positioned on a supporting surface adjacent to, and in-line with, a wheel on a fixed (un-steered) axle of the vehicle or structure to moved, as best seen in FIG. 5. During operation, the powered roller assembly acts to drive the vehicle or structure in a single direction only, hence it must be positioned on the opposite side of the wheel or circumferential surface from the intended direction of travel. Once positioned, the powered roller assembly 100 is moved forward by the operator on the supporting surface to engage the primary roller 102 with the circumferential surface of the selected wheel in a contact region which is located vertically lower than the wheel axis of rotation Rwheel.

To initiate a controlled slow-speed rolling movement of the wheeled vehicle or structure, the power unit 110 is activated to supply a driving torque to only the primary roller 102 through the transmission 108 (if present), rotating the surface of the primary roller in an upward direction through the contact region with the vehicle wheel or circumferential surface. Rotation of the primary roller 102 in this direction about the roller axis Rroller, together with frictional engagement between the primary roller and the wheel or circumferential surface, imparts a force DFt to draw the powered roller assembly 100 inward (towards) and under the arc of the wheel or circumferential surface, acting as a wedge to impart both a lifting force component DFv perpendicular to the supporting surface on which the powered roller assembly 100 is resting, and a motive force component DFh on the wheel or circumferential surface which is acting parallel to the supporting surface. In response to these force components, the vehicle wheel or circumferential surface begins to roll about axis Rwheel in the direction RM, without the need for the operator to apply additional driving forces. Continued operation of the power unit 110 maintains the primary roller 102 in contact with the vehicle wheel or circumferential surface, continuing the rolling movement in direction RM in a controlled manner until the power unit 110 is deactivated. It will be recognized that the lifting force component DFv imparted on the vehicle wheel by the powered roller assembly 100 results in an equal and opposite pressing force urging the powered roller assembly downward towards the supporting surface on which it is disposed.

In a further embodiment, illustrated generally in FIGS. 2-3, the power unit 110 of the assembly 100 is of a compact design, and is mounted within the framework 104 which supports the rollers 102 and 106. An output shaft of the power unit 110, not shown, may extend parallel to the axis of rotation of the primary roller 102, and engage with a suitably configured transmission 108 or drive mechanism, mounted to the framework 104, providing driving torque to the primary roller 102 upon activation. With this configuration, the guide arm 200 may be centrally coupled to the assembly 100 at a connection point 202, facilitating easy use by an operator independent of which side of a vehicle the assembly 100 is positioned. Operational controls for the power unit may be provided on the guide arm 200 and suitably connected to the power unit via cables 204 passing through the connection point 202. Optionally, the connection point 202 may include a joint or pivot, enabling the guide arm 200 to be oriented at a convenient angle for the operator.

In a further embodiment, the portable powered roller assembly 100 includes a brake or locking mechanism (not shown) within the transmission 108 or power unit 110 which holds the primary roller 102 in a fixed rotational position when engaged. This brake or locking mechanism may be used to stop the rolling movement of a vehicle or structure by locking the primary roller 102 to apply a frictional braking force to the wheel or circumferential surface in engagement with the primary roller 102, or to permit the portable powered roller assembly 100 to function as a chock or wheel block, resisting backwards rolling movement of the vehicle wheel or circumferential surface towards the powered roller assembly 100. Either as an alternative to, or in conjunction with a brake or locking mechanism within the transmission 108 or power unit 110, a lever or cam-type mechanism (not shown) may be provided on the framework 104 for lifting the rolling elements, such as the solid rollers 106 off the underlying supporting surface, thereby decreasing the ability of the powered roller assembly 100 to easily roll across the surface. The lever or cam-type mechanism may either place the framework 104 directly into contact with the underlying surface, or may be configured to dispose a set of high-friction contact surfaces into engagement with the underlying contact surface while lifting the rolling elements. By decreasing the rolling ability of the powered roller assembly 100 across the support surface, the roller assembly is better able to function as a chock or wheel brake to prevent rolling movement of a vehicle wheel or circumferential surface in a single direction towards the roller assembly 100.

In an exemplary use as seen in FIG. 5, the powered roller assembly 100 may be utilized during a vehicle wheel alignment service process to provide for a slow, controlled rolling movement of a vehicle during a rolling runout compensation step. The powered roller assembly 100 is particularly advantageous to use during wheel alignment service procedures involving multi-axle heavy trucks, which are difficult for an operator to roll by hand during the rolling runout compensation step, and which are positioned on elevated support surfaces over a service pit, rendering operation from a driver's position difficult. When utilized to move a vehicle during a rolling runout compensation step, the powered roller assembly 100 is positioned in engagement with one of the rear or fixed axle wheels of the vehicle. With suitable alignment sensors mounted to the vehicle wheels, such as angle transducers, or optical targets observed by associated cameras, the powered roller assembly 100 is activated, imparting a motive force to the engaged vehicle wheel, resulting in a slow, steady rolling movement of the vehicle. Necessary measurements may be acquired by the vehicle wheel alignment system either during the actual rolling movement, or at periodic stop points, depending upon the speed and configuration of the vehicle wheel alignment system and selected sensors. The slow, steady rolling movement is sufficiently slow such that there is little or no risk of an uncontrolled movement of the vehicle, and the vehicle will cease rolling movement quickly upon deactivation of the powered roller assembly 100. Once the necessary measurements are acquired, or the vehicle has traversed a required distance, the powered roller assembly 100 is deactivated and/or locked in position. If the vehicle is to be returned to the original starting location, the powered roller assembly 100 is removed and optionally repositioned on the opposite side of the vehicle wheel, and the process repeated with the vehicle moving in the reverse direction.

Those of ordinary skill in the art will readily recognize a wide range of uses for the powered roller assembly 100 of the present disclosure, and that such uses are not limited to the exemplary vehicle wheel alignment service procedure set forth above. Rather, a suitably sized and configured powered roller assembly 100 of the present disclosure may be utilized in any application wherein there is a need to provide a controlled slow-speed roll of a wheeled vehicle or rolling structure such as a roll of material having a circumferential surface by application of a motive force applied directly to an external circumferential surface only. These applications may include moving disabled vehicles from a roadway travel lane, moving or repositioning of aircraft on the ground, moving or repositioning of vehicles in museum exhibits, or moving or repositioning of vehicles in close quarters parking structures.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for imparting a rolling movement to a vehicle having at least one pair of steered wheels and at least one pair of fixed wheels during a vehicle service procedure, comprising:

positioning the vehicle on a supporting surface;

positioning a powered roller assembly in abutting engagement with an outer circumferential surface of one of said fixed wheels at a position which is vertically lower than an axis of rotation for said fixed wheel, on a side of the fixed wheel opposite from an intended direction of rolling movement;

activating said powered roller assembly to rotationally drive only a primary roller to apply a motive force exclusively to said circumferential surface of the fixed wheel, said motive force generated only by rotational movement of the primary roller in engagement with said circumferential surface of the fixed wheel, said motive force sufficient to impart a rolling movement to said fixed wheel and vehicle in said intended direction;

wherein said application of motive force to said circumferential surface of said fixed wheel draws said powered roller assembly in the intended direction of rolling movement; and acquiring data associated with said vehicle service procedure in conjunction with said rolling movement.

2. The method of claim 1 further including the steps of deactivating said powered roller assembly and reversibly locking said primary roller against rotation while in contact with said circumferential surface of the fixed wheel; and whereby said powered roller assembly chocks said fixed wheel against rolling movement in at least one direction.

3. The method of claim 1 wherein said vehicle service procedure is a vehicle wheel alignment measurement procedure, and wherein said acquired data is associated with an orientation of at least one of said steered wheels or said fixed wheels.

4. A method for imparting a rolling movement to a vehicle disposed on a supporting surface by at least one wheel, comprising:

positioning a powered roller assembly adjacent to said at least one wheel to engage said at least one wheel only with a circumferential surface of a primary roller, said primary roller in contact with a circumferential surface of said at least one wheel at a point which is vertically lower than an axis of rotation of said at least one wheel and on a side of said at least one wheel opposite from an intended direction of rolling movement;

activating said powered roller assembly to rotationally drive said primary roller about a roller rotational axis, in a rotational direction which is opposite to an intended rotational direction of said at least one wheel about said wheel axis of rotation, said driven rotation of said primary roller applying a driving force to only said engaged circumferential surface of said at least one wheel, said driving force having a first force component perpendicular to said supporting surface, and a second force component horizontal to said supporting surface;

wherein said first force component applies a lifting force to said at least one wheel; and wherein said second force component applies a motive force to said at least one wheel.

5. The method of claim 3 wherein activating said powered roller assembly wedges said powered roller assembly below said circumferential surface of said at least one wheel, imparting a rolling movement there to.

6. The method of claim 3 wherein said motive force further urges said powered roller assembly in said intended direction of rolling movement.

7. The method of claim 3 further including the steps of deactivating said powered roller assembly following rolling movement of said vehicle to a desired location; and maintaining said primary roller in engagement with said circumferential surface of said at least one wheel, whereby said powered roller assembly chocks said at least one wheel against rotation in at least one direction.

8. The method of claim 7 further including the step of holding said primary roller against rotation about said roller rotational axis, said primary roller applying a frictional braking force to chock said at least one wheel.

9. A method for pushing a vehicle wheel assembly across a supporting surface with a powered roller assembly by rolling said vehicle wheel assembly about an axis of rotation in a driven direction, comprising:
supporting a primary roller within a framework of said powered roller assembly for driven rotation about a drive axis above the supporting surface, said framework supported on the supporting surface by a set of freely rotating rolling elements;
engaging said powered roller assembly with side vehicle wheel assembly at only an outer circumferential surface of said vehicle wheel assembly such that said primary roller contacts said vehicle wheel assembly outer circumferential surface below said axis of rotation and opposite from said driven direction;
activating a drive unit within said framework to supply a torque to rotationally drive said primary roller about said drive axis while an outer circumferential surface of said primary roller is in exclusive engagement with said outer circumferential surface of said vehicle wheel assembly, imparting a frictional force to said outer circumferential surface of said vehicle wheel assembly, said frictional force rotating said vehicle wheel assembly about said axis of rotation for movement in said driven direction; and
wherein said friction force further draws said primary roller and said framework in said driven direction.

10. The method of claim 9 wherein said frictional force further includes a lifting force component exerting a vertical load on said vehicle wheel assembly and said framework while said primary roller is in engagement with said outer circumferential surface of said vehicle wheel assembly.

11. The method of claim 9 further including the step of deactivating said drive unit to chock said vehicle wheel assembly against rolling movement opposite to said driven direction while said primary roller is in engagement with said outer circumferential surface of said vehicle wheel assembly.

12. The method of claim 11 wherein deactivating said drive unit provides a frictional braking force at said primary roller to chock said vehicle wheel assembly.

* * * * *